United States Patent Office 3,809,716
Patented May 7, 1974

3,809,716
PROCESS FOR THE PRODUCTION OF
1,1,2-TRIACETOXYETHANE
Klaus Udluft, Constance, Wolfgang Weigert, Offenbach, Heribert Offermanns, Grossauheim, and Hans Wagner, Constance, Germany, assignors to Deutsche Gold- und Silber-Scheideanstalt vormals Roessler, Frankfurt am Main, Germany
No Drawing. Filed Aug. 13, 1973, Ser. No. 387,617
Claims priority, application Germany, Aug. 10, 1972, P 22 39 278.5
Int. Cl. C07c 67/00
U.S. Cl. 260—491                                                 5 Claims

ABSTRACT OF THE DISCLOSURE 1,1,2 - triacetoxyethane is produced by reacting monochloroacetaldehyde with acetic anhydride and a salt of acetic acid.

---

The invention is directed to a process for the production of 1,1,2-triacetoxyethane (gylcolic aldehyde hydrate triacetate). This material is especially valuable as a starting material for the production of the aminoacid D,L-serine, which is important as an intermediate product for pharmaceuticals.

It is known to produce triacetoxyethane by bromination of vinyl acetate and reaction of the dibromoethyl acetate formed with sodium acetate and acetic anhydride (Gross German Auslegeschrift 1,213,416). The disadvantage is that this process requires the production of the dibromoethylacetate which is troublesome and because of the use of bromine is expensive.

There has now been found a process for the production of 1,1,2-triacetoxyethane by the reaction of a halogen compound with a salt of acetic acid and acetic anhydride which is based on the reaction of monochloroacetaldehyde.

Thereby there are obtained yields of over 99%. In view of the great reactivity of monochloroacetaldehyde and its tendency toward the formation of condensation products it is surprising that it can be converted into triacetoxyethane without noticeable formation of byproducts. The process of the invention makes it possible to produce D,L-serine with high yields from a simple, easily available starting material.

To carry out the process of the invention monochloroacetaldehyde is reacted with a mixture of acetic anhydride and a salt of acetic acid. As salts of acetic acid there are chiefly employed those with monovalent or divalent cations, e.g. inorganic cations, preferably the alkali acetates, especially sodium acetate and potassium acetate. Other suitable salts include calcium acetate, zinc acetate, cadmium acetate, copper acetate, silver acetate, magnesium acetate, strontium acetate and barium acetate. The salts can be added as such or can be formed in the reaction mixture of acetic acid or acetic anhydride and a compound of the particular cation. Especially useful as such compounds are the oxides, hydroxides and carbonates, e.g. sodium carbonate, potassium carbonate, calcium carbonate, barium carbonate, strontium carbonate, magnesium carbonate, sodium hydroxide, barium hydroxide, potassium hydroxide, calcium hydroxide, strontium hydroxide, magnesium hydroxide, sodium oxide, potassium oxide, calcium oxide, barium oxide, magnesium oxide, strontium oxide, zinc oxide, copper carbonate zinc carbonate, etc.

Generally for each mole of monochloroacetaldehyde there is used at least one mole of the salt of acetic acid and also at least one mole of acetic anhydride. The upper limit on the amount of the salt of acetic acid and acetic anhydride is not particularly critical. Mostly there is recommended that there be added per mole of monochloroacetaldehyde 1.05 to 1.50, especially 1.20 to 1.35, moles of acetate. The amount of acetic anhydride is suitably chosen so as to be larger, the greater the water content of the other materials. Generally there is used 3 to 20 moles of acetic anhydride per mole of monochloroacetaldehyde. Using a water free sodium acetate and a 70% aqueous solution of monochloroacetaldehyde it is preferred to add 7 to 14 moles of acetic anhydride per mole of the aldehyde.

The reaction takes place at atmospheric pressure suitable at temperatures between 100 and 140° C., especially at the boiling temperature of the reaction mixture which, depending on the composition, is between about 120 and 140° C. It is also possible to use reduced pressure or superatmospheric pressure and temperatures outside the range specified above.

The triacetoxyethane can be separated from the reaction mixture the solvent is distilled off under reduced pressure. The pure triacetoxyethane can be recovered from the residue by extraction with a suitable inert solvent and fractional distillation of the extract. The residue, however, can be used directly for the further reaction of the triacetoxyethane to form D,L-serine.

The conversion of the triacetoxyethane into D,L-serine can be accomplished by treating the triacetoxyethane in known manner, for example according to the process of Gross German Auslegeschrift 1,213,416, the entire disclosure of which is hereby incorporated by reference. It can be reacted either with ammonium carbonate and sodium cyanide to form the hydantoin or with ammonia, ammonium chloride and sodium cyanide to the aminonitrile. These compounds are then saponified by means of an acid to form D,L-serine. Unless otherwise indicated all parts and percentages are by weight.

EXAMPLE 1

Within 2 hours there were dropped into a suspension of 111 grams (1.4 moles) of water free sodium acetate in 880 ml. (9.3 moles) of acetic anhydride 105 grams of an aqueous solution containing 75 weight percent of monochloroacetaldehyde (1.0 mole monochloroacetaldehyde). The mixture was held during this period and a further 15 hours at the boiling temperature. This was 136° C. at the beginning and 125° C. at the end. The reaction mixture was cooled and freed of the solvent in a vacuum rotary evaporator at a bath temperature of 60° C. There were recovered from the distillate 216 grams of acetic acid and 570 ml. of acetic anhydride. The residue was extracted with carbon tetrachloride, first with 350 ml. and then with 100 ml. The carbon tetrachloride was removed from the extracts at reduced pressure, then there passed over at a B.P.$_{12}$ up to 117° C. a forerun and at B.P.$_{12}$ 117 to 125° C. pure 1,1,2-triacetoxyethane. The forerun was used together with the previously recovered unreacted acetic anhydride for further starting materials. Each preparation averaged 203.6 grams of 1,1,2-triacetoxyethane. This corresponds to a yield of 99.8%.

To convert the 1,1,2-triacetoxyethane recovered into D,L-serine one mole was dissolved in 250 ml. of methanol with heating to 40 to 50° C. This solution was introduced into a mixture of 350 ml. of 25% aqueous ammonia solution (4.7 moles of ammonia), 58.8 grams (1.1 moles) of ammonium chloride and 53.8 grams (1.1 moles) of sodium cyanide at a temperature below 25° C. Then the mixture was held for 2 hours at 50° C. and subsequently freed from methanol and ammonia at reduced pressure and a bath temperature up to 30° C. The remaining mixture after addition of 510 ml. of concentrated aqueous hydrochloric acid was held for one hour at 108 to 110° C., then treated with 250 ml. of water, 10 grams of activated carbon and finally filtered with suction. The filtrate, which was light brown in color, was concentrated at 80° C. and 10 torr until no more water distilled. The warm residue was treated with 250 ml. of methanol, comminuted, filtered with suction, washed with 50 ml. of methanol, taken up in 150 ml. of methanol, again filtered and washed with 50 ml. of methanol. The filtrate (550 ml.) was diluted with 100 ml. of water and adjusted to a pH of 6.8 with concentrated aqueous ammonia solution. Thereby the serine began to crystallize out of the mixture. This was stirred for three hours, then cooled to 10° C. and filtered with suction. The residue was dried at 80 to 90° C. under reduced pressure. There were obtained 85 grams, corresponding to an 81% yield of a light brown colored crude serine containing 1.5% ammonium chloride. For purification the crude serine was dissolved in 240 ml. of water. After the addition of 3 grams of activated carbon the solution was held for 10 minutes at the boiling temperature and then filtered hot with suction. To the filtrate there were added 240 ml. of methanol. The mixture was stirred for 3 hours, the serine crystallizing out was then filtered off with suction. The yield amounted to 74.5 grams, corresponding to 71%. By working up of the mother liquor there were recovered a further 3.3 grams, corresponding to 3.2%, so that the total yield of D,L-serine was 74.2%.

EXAMPLE 2

The procedure was the same as in Example 1 except there were added 131 grams of a 60% aqueous solution of chloroacetaldehyde (1.0 mole of chloroacetaldehyde), 111 grams (1.4 moles) of water free sodium acetate and 1020 grams (10.8 moles) of acetic anhydride. Besides 430 grams of acetic acid and 570 ml. of acetic anhydride there were recovered 203.0 grams of 1,1,2-triacetoxyethane, corresponding to a yield of 99.5%.

EXAMPLE 3

The procedure was the same as in Example 1 except there were added 131 grams of a 60% aqueous solution of chloroacetaldehyde (1.0 mole), 266 grams of water free zinc acetate (1.45 moles) and 1020 grams of acetic anhydride (10.8 moles). Besides 424 grams of acetic acid and 578 ml. of acetic anhydride there were recovered 164 grams of 1,1,2-triacetoxyethane, corresponding to a yield of 80.5%.

EXAMPLE 4

The procedure was the same as in Example 1 except there were added 131 grams of a 60% aqueous solution of chloroacetaldehyde (1.0 mole), 111 grams of calcium hydroxide (1.50 mole) and 1228 grams (13.0 moles) of acetic anhydride. Besides 544 grams of acetic acid and 590 ml. of acetic anhydride there were recovered 178 grams of 1,1,2-triacetoxyethane, corresponding to a yield of 87.2%.

What is claimed is:

1. A process for the production of 1,1,2-triacetoxyethane comprising reacting monochloroacetaldehyde with acetic anhydride and an alkali metal, alkaline earth metal, copper, cadmium, silver or zinc salt of acetic acid.
2. A process according to claim 1 wherein the salt is sodium acetate or potassium acetate.
3. A process according to claim 1 wherein there are employed 1.05 to 1.50 moles of the salt and 3 to 20 moles of acetic anhydride per mole of monochloroacetaldehyde.
4. A process according to claim 1 wherein the reaction is carried out at 120 to 140° C.
5. A process according to claim 1 wherein the reaction is carried out at the boiling temperature of the mixture.

References Cited

UNITED STATES PATENTS 3,574,714   4/1971   Fujinami et al. _____ 260—494

FOREIGN PATENTS 493,196   10/1938   Great Britain _____ 260—494

VIVIAN GARNER, Primary Examiner

U.S. Cl. X.R.

260—494, 534